May 29, 1945.　　　W. P. GISLESON　　　2,377,225
SUN VISOR ATTACHMENT
Filed Aug. 14, 1942
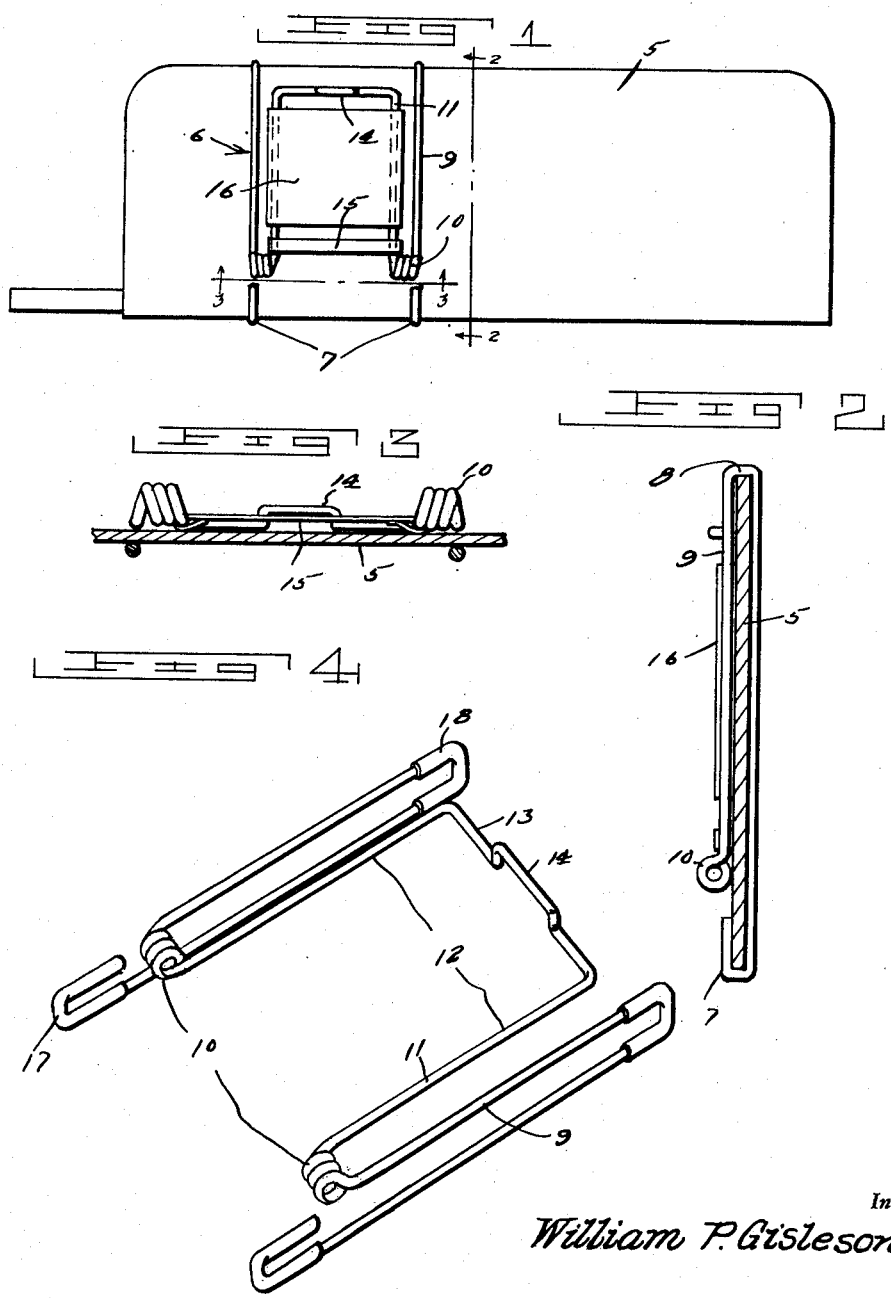
Inventor
William P. Gisleson
By Clarence A. O'Brien
and Harvey B. Jacobson
Attorneys Patented May 29, 1945

2,377,225

UNITED STATES PATENT OFFICE 2,377,225

SUN VISOR ATTACHMENT

William P. Gisleson, Charles City, Iowa

Application August 14, 1942, Serial No. 454,851

2 Claims. (Cl. 40—11)

The present invention relates to new and useful improvements in attachments for sun visors of automobiles and has for its primary object to provide a clip member designed primarily for holding paper, cards and other small articles in a position against the underside of the visor.

A further object is to provide an attachment of this character which may be easily and quickly placed in position on a sun visor of conventional construction and which at the same time is neat and attractive in appearance, relatively inexpensive to manufacture and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout and in which:

Figure 1 is a view in elevation of a sun visor with the attachment shown in position thereon.

Figure 2 is a transverse sectional view through the visor taken substantially on a line 2—2 of Figure 1.

Figure 3 is a fragmentary sectional view taken substantially on the line 3—3 of Figure 1.

Figure 4 is a perspective view of the attachment removed from the sun visor.

Referring now to the drawing in detail the numeral 5 designates a sun visor of an automobile of conventional construction with the attachment designated generally at 6 shown in position thereon.

The attachment is constructed of a continuous strand of spring wire material having its end portions bent substantially in the form of hooks 7—7 engaged over one edge of the visor, the material extending from said hook portions transversely across one surface of the visor and bent as shown at 8 at a relative opposite edge of the visor and then extended transversely as shown at 9 across the opposite face of the visor to provide a pair of clips disposed in spaced parallel relation and composed of substantially spaced parallel legs engaging opposite surfaces of the visor as will be apparent from an inspection of Figure 2 of the drawing.

Extending from the leg members 9 of each of the clips the wire is bent to form coils 10—10 and extending from the coils the wire is bent to form a substantially U-shaped clamping member 11 composed of the spaced parallel leg portions 12 connected by the cross member 13. The cross member 13 is formed with an offset finger-gripping portion 14 projecting outwardly from the surface of the visor.

The leg members 12 of the clamping member are connected adjacent their inner ends by a relatively thin strip of metal 15 adapted to provide means for attaching a book of matches thereto and the leg members 12 are also connected by a sheet of material 16 on which suitable advertisements may be displayed.

From the foregoing it will be apparent that the clamping member 11 may be swung outwardly from its point of connection to the coils 10 by grasping the finger-grip portion 14 and maps, letters, papers and other light parcels may be clamped in position against the visor thereby.

In the form of the invention illustrated in Figure 4 of the drawing the hook members 7 may be covered by rubber tubing 17 and similar tubing 18 may be fitted over the bent portion 8 to prevent injury to opposite edges of the visor.

It is believed the details of construction, advantages and manner of use of the device will be readily understood from the foregoing without further detailed explanation.

Having described the invention. what is claimed as new is:

1. An attachment of the class described comprising a strand of spring wire having its ends bent to form hooks adapted for engaging one side of a flat object, the wire extending from said hooks along one surface of the object and back along its opposite surface in a direction toward the hooks to form a pair of spaced clips, a U-shaped clamping member formed at an intermediate portion of the wire and adapted for positioning between the opposite edges of the object and disposed against said last named surface of the object and including spaced parallel legs movable into and out of clamping relation to the object, and spring coils in the wire at the junction of said legs with said clips and providing fulcrums for the legs of the clamping member during movement of the latter.

2. An attachment of the class described comprising a strand of spring wire having its ends bent to form hooks adapted for engaging one edge of a flat object, clips formed from the wire engaging at relative opposite edges of the object and disposed against each surface of the object, a clamping member formed at an intermediate portion of the wire and including spaced parallel legs, a cross member connecting one end of the legs, an offset portion in said cross member providing a finger grip for moving the legs relative to said object, coil springs connecting the other ends of the legs of said clamping member to said clips, and a second cross member connecting the legs at a point adjacent said springs.

WILLIAM P. GISLESON.